(12) United States Patent
Shin

(10) Patent No.: US 11,260,806 B2
(45) Date of Patent: Mar. 1, 2022

(54) TOOL CASE FIXING STRUCTURE OF VEHICLE

(71) Applicants: Hyundai Motor Company, Seoul (KR); Kia Motors Corporation, Seoul (KR)

(72) Inventor: Sang Min Shin, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/034,545

(22) Filed: Sep. 28, 2020

(65) Prior Publication Data

US 2021/0178987 A1 Jun. 17, 2021

(30) Foreign Application Priority Data

Dec. 16, 2019 (KR) .......................... 10-2019-0168058

(51) Int. Cl.
*B60R 11/06* (2006.01)
*B62D 43/10* (2006.01)
*B60R 7/02* (2006.01)

(52) U.S. Cl.
CPC ............... *B60R 11/06* (2013.01); *B60R 7/02* (2013.01); *B62D 43/10* (2013.01)

(58) Field of Classification Search
CPC ........... B60R 9/00; B60R 11/06; B60R 9/065; B60R 9/06; B60R 5/04; B60R 11/00; B60R 5/041; B60R 9/02
USPC ......... 296/37.6, 183.1, 39.2, 100.01, 100.17, 296/37.5, 50, 51, 57.1, 76, 65.01, 64; 224/404, 274, 282, 402, 486, 535, 539, 224/540, 564, 555, 548
See application file for complete search history.

(56) References Cited

U.S. PATENT DOCUMENTS

| | | | | |
|---|---|---|---|---|
| 6,082,803 | A * | 7/2000 | Klueger | B62D 43/10 224/42.24 |
| 6,336,671 | B1 * | 1/2002 | Leonardi | B60R 5/04 224/42.13 |
| 7,770,764 | B2 * | 8/2010 | Rock | B62D 35/02 224/42.23 |
| 9,539,957 | B2 * | 1/2017 | Engerman | B25H 3/02 |
| 10,532,701 | B2 * | 1/2020 | Barrera Munoz | B60R 13/011 |

FOREIGN PATENT DOCUMENTS

| | | |
|---|---|---|
| CN | 203580797 U | 5/2014 |
| CN | 205952097 U | 2/2017 |
| JP | H 0840312 A | 2/1996 |

(Continued)

*Primary Examiner* — D Glenn Dayoan
*Assistant Examiner* — Sunsurraye Westbrook
(74) *Attorney, Agent, or Firm* — Mintz Levin Cohn Ferris Glovsky and Popeo, P.C.; Peter F. Corless

(57) ABSTRACT

A tool case fixing structure of a vehicle includes at least two weld stud bolts located on a floor panel of a vehicle body and formed at a front end and a rear end in a length direction of a vehicle, a case body inserted into one side of a spare tire of the vehicle and having a plurality of tool grooves formed to insert a tool into the tool grooves, at least two fastener holes formed on the case body corresponding to locations of the weld stud bolts, and at least two fasteners formed corresponding to locations of the fastener holes and configured to be fastened with the weld stud bolts to fix the case body to the vehicle body.

9 Claims, 3 Drawing Sheets

(56) References Cited

FOREIGN PATENT DOCUMENTS

| | | |
|---|---|---|
| JP | 2001-253303 A | 9/2001 |
| KR | 10-0494796 B1 | 6/2005 |
| KR | 10-1242012 B | 3/2013 |

* cited by examiner

TOOL CASE FIXING STRUCTURE OF VEHICLE

CROSS-REFERENCE TO RELATED APPLICATION

This application claims under 35 U.S.C. § 119(a) the benefit of Korean Patent Application No. 10-2019-0168058 filed on Dec. 16, 2019, the entire contents of which are incorporated herein by reference.

BACKGROUND

(a) Technical Field

The present disclosure relates to a tool case fixing structure of a vehicle, more particularly, to the tool case fixing structure that can prevent a tool case from separating and falling even when supporting a spare tire through a fastener structure being fixed to a vehicle body, and can heighten spatial utility of a concept car (or anticipated future vehicle) mounted with a battery through installation of the tool case in a side space of the spare tire.

(b) Description of the Related Art

If an emergency situation occurs in a vehicle in a state where it is not possible to visit a garage, a vehicle user may take emergency measures using a tool provided in the vehicle.

As an example, if a tire is punctured during driving, the user may use the tool provided in the vehicle to replace the punctured tire by a spare tire. If a tool for a vehicle is stored in a tool case, and the tool case is stored around the spare tire, the tool case in the related art, as illustrated in FIG. 1 (RELATED ART), has a structure in which the tool case is inserted into an inner space of a wheel of the spare tire to be stored therein, and an outer border of the tool case is installed to come in frictional contact with a rim.

That is, typically a spare tire is fixedly installed in a trunk room. That is, the spare tire is installed in a manner that a clamp penetrates a hub of the wheel, a nut fixed to a vehicle body that forms the trunk room is fixed thereto, and the clamp is fastened to the nut. In this case, the tool case is structured to be inserted into the inner space of the wheel of the spare tire as the outer border of the tool case comes in frictional contact with the rim.

Accordingly, the tool case in the related art may cause damage to the rim of the wheel, and in particular, the tool case should be separately manufactured depending on the type of spare tire.

Further, in the tool case, various kinds of tools, such as bolts, a wrench, and a jack, are stored, and among them, a tool such as a jack is large-sized, and thus it is required that the tool is securely fixed to the tool case so that a noise, such as a rattle noise, does not occur. However, the tool case in the related art is not provided with a separate structure for fixing a large-sized tool, such as a jack, and due to this, a noise may occur as the tool separates from the tool case, and in severe cases, such separation of the tool may cause neighboring components to be damaged.

On the other hand, in a concept car or anticipated future vehicle, a battery should be additionally mounted on a well portion of a spare tire, but insufficient space is provided to load a separate tool case on the spare tire. Accordingly, there has been a need for a tool case shape using the rear space of the vehicle mounted with a battery and a fixing structure capable of being fixed to the vehicle body.

The above information disclosed in this background section is only for enhancement of understanding of the background of the present disclosure and therefore it may contain information that does not form the prior art that is already known in this country to a person of ordinary skill in the art.

SUMMARY

The present disclosure provides a tool case fixing structure of a vehicle, which can fix a tool case installed in a side space of a spare tire.

Further, the present disclosure provides a tool case fixing structure of a vehicle, which can provide a tool case being fixed to a vehicle body through weld stud bolt and fastener structures.

The objects of the present disclosure are not limited to those as described above, and other unmentioned objects of the present disclosure can be understood by the following explanation, and can be known more clearly by embodiments of the present disclosure. Further, the objects of the present disclosure can be realized by means and combinations thereof indicated in claims.

A tool case fixing structure of a vehicle to achieve the above objects of the present disclosure includes the following configurations.

In one aspect of the present disclosure, a tool case fixing structure of a vehicle includes at least two weld stud bolts located on a floor panel of a vehicle body and formed at a front end and a rear end in a length direction of a vehicle; a case body inserted into one side of a spare tire of the vehicle and having a plurality of tool grooves formed to insert a tool into the tool grooves; at least two fastener holes formed on the case body corresponding to locations of the weld stud bolts; and at least two fasteners formed corresponding to locations of the fastener holes and configured to be fastened with the weld stud bolts to fix the case body to the vehicle body.

The fastener includes an upper fastener pressed into an upper portion of the case body; and a lower fastener pressed into a lower portion of the case body and configured to cause the weld stud bolt to be pressed into the lower fastener.

The upper fastener includes an upper stopper configured to be exposed to an upper surface of the case body; and an upper fastening portion formed at an end of the upper stopper, and the lower fastener includes a lower stopper configured to be inserted into a lower surface of the case body; and a lower fastening portion formed at an end of the lower stopper.

A clip shape is formed on at least one end of the upper fastening portion, a step height corresponding to the clip shape of the upper fastening portion is formed at one end of the lower fastening portion, and the upper fastening portion and the lower fastening portion are fastened to each other.

The fastener is installed to be visually recognizable, i.e., visible to a user.

The case body is fixedly installed to be spaced apart for a predetermined distance from an outer diameter of the spare tire.

The fastener fixes the case body in two pieces (e.g., a 2-piece type), and is formed of a plastic material.

One side surface and a lower surface of the case body are configured to have a shape corresponding to a shape of the vehicle body to be supported on the vehicle body surface.

The case body is configured to have the tool grooves formed on a lower portion of the case body in a height direction.

According to the present disclosure, the following effects can be obtained through the combination and usage relationships between the above-described embodiment and the configuration to be described below.

The present disclosure provides a tool case fixing structure of a vehicle, which can fix a tool case installed in a side space of a spare tire, and thus it has the effects to heighten spatial utility of a concept car (or future vehicle) mounted with a battery.

Further, the present disclosure provides a tool case being fixed to a vehicle body through weld stud bolt and fastener structures, and thus it can prevent a rattle noise, heighten fixation, and prevent a tool case from separating and falling even when supporting a spare tire.

Other aspects and preferred embodiments of the present disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinafter by way of illustration only, and thus are not limitative of the present disclosure, and wherein.

Figure 1:
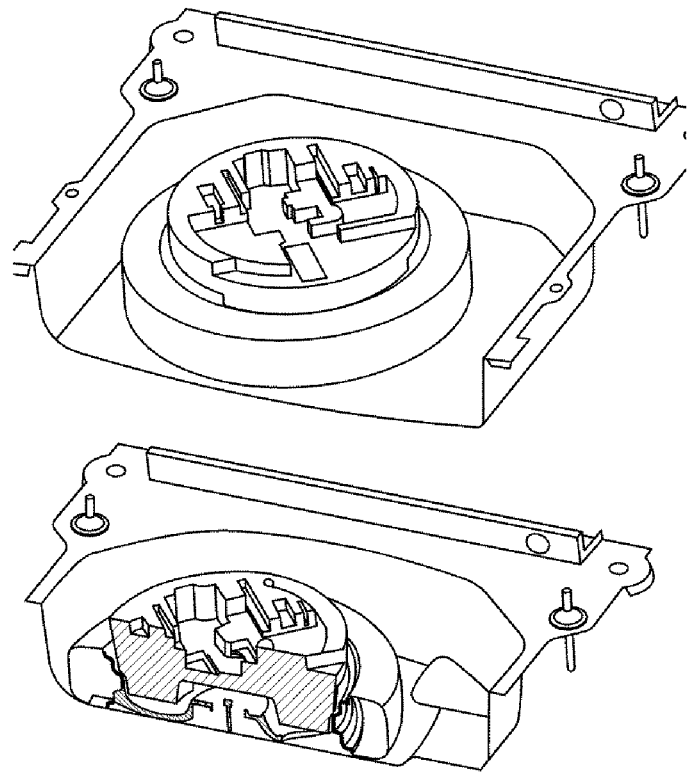
FIG. 1 (RELATED ART) is a view illustrating a tool case in the related art installed on a spare tire.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, reference will now be made in detail to various embodiments of the present disclosure, examples of which are illustrated in the accompanying drawings and described below. While the present disclosure will be described in conjunction with exemplary embodiments, it will be understood that present description is not intended to limit the present disclosure to those exemplary embodiments. On the contrary, the present disclosure is intended to cover not only the exemplary embodiments, but also various alternatives, modifications, equivalents and other embodiments, which may be included within the spirit and scope of the present disclosure as defined by the appended claims.

Further, the term "~part" as described in the description may mean a unit for processing at least one function or operation, and this may be implemented by hardware, software, or a combination of hardware and software.

Further, in the description, the terms "height direction" and "length direction" are defined based on a vehicle.

Figure 2:
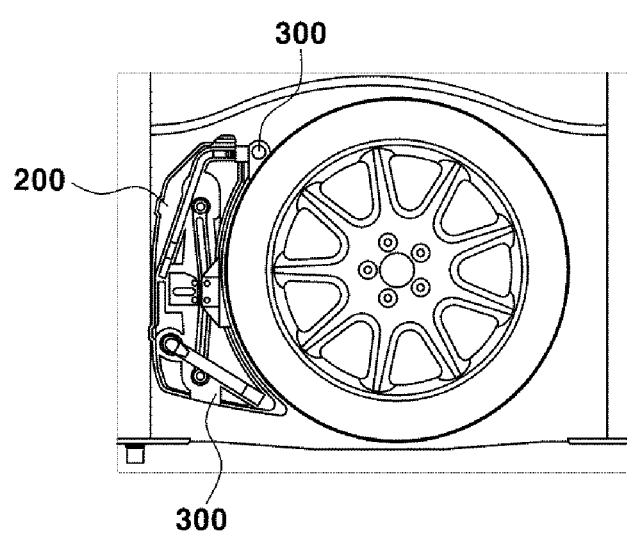
FIG. 2 is a view illustrating a state where a tool case is installed on a spare tire of a tool case fixing structure of a vehicle according to an embodiment of the present disclosure.
Figure 3:
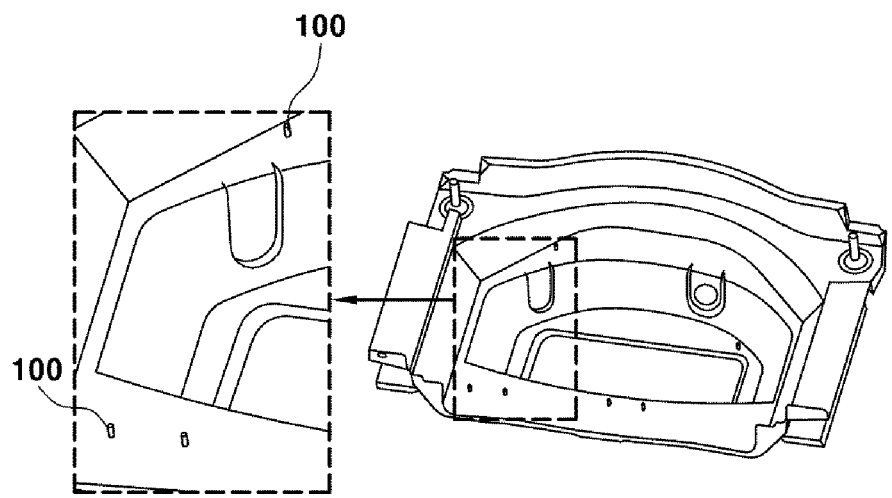
FIG. 3 is a view illustrating weld stud bolts of a tool case fixing structure of a vehicle according to an embodiment of the present disclosure.

The present disclosure relates to a tool case fixing structure of a vehicle. FIG. 2 is a view illustrating a state where a tool case is installed on a spare tire of a tool case fixing structure of a vehicle according to an embodiment of the present disclosure, and FIG. 3 is a view illustrating weld stud bolts of a tool case fixing structure of a vehicle according to an embodiment of the present disclosure.

A tool case fixing structure of a vehicle according to an embodiment of the present disclosure includes at least two weld stud bolts 100 located on a floor panel of a vehicle body and formed at a front end and a rear end in a length direction of a vehicle, a case body 200 inserted into one side of a spare tire of the vehicle and having a plurality of tool grooves formed to insert a tool into the tool grooves, at least two fastener holes 300 formed on the case body 200 corresponding to locations of the weld stud bolts 100, and at least two fasteners 400 formed corresponding to locations of the fastener holes 300 and configured to be fastened with the stud bolts to fix the case body 200 to the vehicle body.

At least two weld stud bolts 100 may be located on the floor panel of the vehicle body, and are formed at front and rear ends in the length direction of the vehicle. The weld stud bolts 100 are configured to mount functional components on the vehicle body, and may be installed by welding after being penetratingly inserted into mount portions formed on the vehicle body panel.

The case body 200 may be inserted into one side of the spare tire of the vehicle, and a plurality of tool grooves for inserting the tool may be formed on the case body 200. The case body 200 may be formed as a shape corresponding to a space between the spare tire and a trunk in a trunk space in which the spare tire is mounted. A battery may be mounted at a lower end of the spare tire in a state where the spare tire and the case body 200 are installed. The case body 200 may be configured to be fixed to the vehicle body so that it does not separate from the vehicle body even when supporting a spare tire.

The case body 200 according to an embodiment of the present disclosure may be fixedly installed to be spaced apart for a predetermined distance from an outer diameter of the spare tire. More preferably, one side surface of the case body 200 may be installed to be spaced apart for about 10 mm from the outer diameter of the spare tire. Through this, even in the case of preassembling the case body 200, the spare tire can be mounted without interference. Further, it can be prevented in advance that the case body 200 damages the spare tire by preventing the case body 200 and the spare tire from coming in contact with each other.

The weld stud bolts 100 may be fixedly installed in locations corresponding to one end and the other end of the case body 200 so as to stably fix the case body 200 at two fixing points.

At least two fastener holes 300 may be formed on the case body 200 corresponding to the locations of the weld stud bolts 100. At least two fasteners 400 may be formed corresponding to the locations of the fastener holes 300. The fasteners 400 may be fastened with the weld stud bolts 100 to fix the case body 200 to the vehicle body.

The fastener hole 300 may be formed to penetrate the one end and the other end of the lower portion of the case body 200. The fastener 400 may be configured to be inserted into the inside of the fastener hole 300. The weld stud bolt 100 may be inserted into and combined with the inside of the fastener 400.

Figure 4:
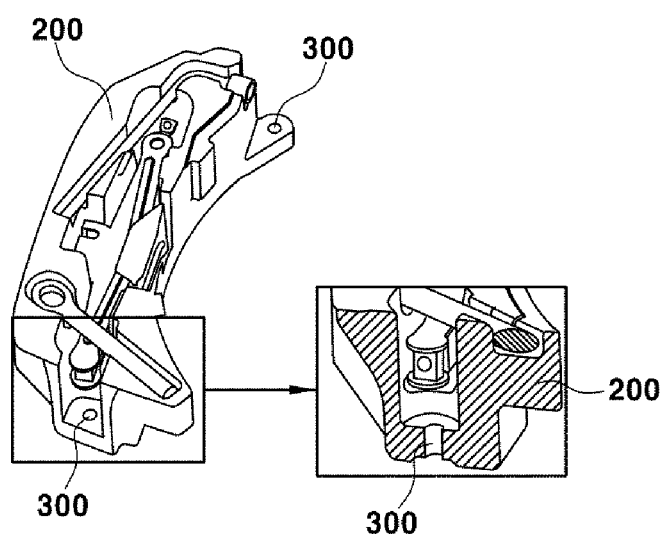
FIG. 4 is a perspective view illustrating a tool case fixing structure of a vehicle according to an embodiment of the present disclosure.

FIG. 4 is a perspective view illustrating a tool case fixing structure of a vehicle according to an embodiment of the present disclosure.

With reference to FIG. 4, in the tool case fixing structure of the vehicle according to an embodiment of the present disclosure, the fastener 400 is installed to be visually recognizable, i.e., visible to a user.

The fastener 400 may be inserted through the fastener hole 300 formed on the case body 200, and thus the case body 200 may be fixed to the vehicle body. In this case, the fastener 400 may be inserted into upper and lower portions of the fastener hole 300, and thus after the completion of the assembly, the fastener 400 inserted into the upper portion can be easily identified by a user (i.e., visible to the user).

In the tool case fixing structure of the vehicle according to an embodiment of the present disclosure, one side surface and a lower surface of the case body 200 may be configured to have a shape corresponding to the shape of the vehicle body. Further, the case body 200 may be configured to have the tool grooves formed on a lower portion of the case body in a height direction.

One side surface of the case body 200 may be supported by the vehicle body surface, and the other side surface thereof may be installed to be spaced apart from the spare tire. Further, if the cross-section of the lower surface of the case body 200 is in the shape of an inverted triangle, the tool case may fall down, and thus the lower surface of the case body 200 may be configured to have a specific area corresponding to the shape of the vehicle body so as to be supported by the vehicle body surface.

A plurality of tool grooves for inserting a tool into the tool grooves may be formed on the case body 200, and if a heavy tool is inserted into the upper portion of the case body 200, the case body 200 may be slanted. Accordingly, the case body 200 may be configured so that the tool grooves are formed on the lower portion of the case body in the height direction, and thus in the case where the tool is inserted into the case body 200, the weight center can be stably lowered.

Figure 5:
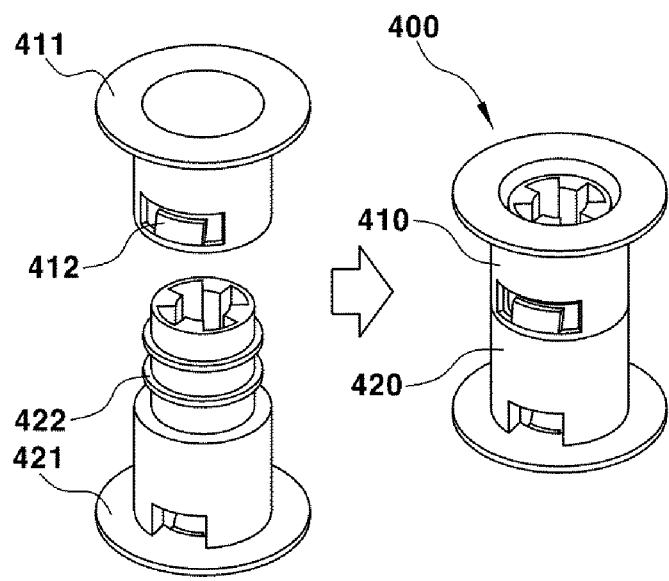
FIG. 5 is a perspective view illustrating a fastener of a tool case fixing structure of a vehicle according to an embodiment of the present disclosure.
Figure 6:
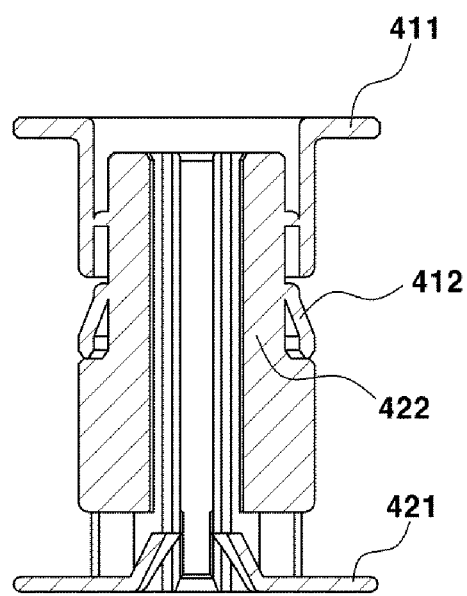
FIG. 6 is a cross-sectional view illustrating a fastener of a tool case fixing structure of a vehicle according to an embodiment of the present disclosure.

FIG. 5 is a perspective view illustrating a fastener of a tool case fixing structure of a vehicle according to an embodiment of the present disclosure, and FIG. 6 is a cross-sectional view illustrating a fastener of a tool case fixing structure of a vehicle according to an embodiment of the present disclosure.

With reference to FIGS. 5 and 6, in the tool case fixing structure of a vehicle according to an embodiment of the present disclosure, the fastener 400 may include an upper fastener 410 pressed into an upper portion of the case body 200, and a lower fastener 420 pressed into a lower portion of the case body 200 and configured to cause the weld stud bolt 100 to be pressed into the lower fastener 420.

The upper fastener 410 may be pressed and fixed into the upper portion of the case body 200. More preferably, the upper fastener 410 may be formed corresponding to the size of the fastener hole 300 of the case body 200, and may be configured to be pressed into an upper portion of the fastener hole 300.

The lower fastener 420 may be pressed into the lower portion of the case body 200, and may be configured to cause the weld stud bolt 100 to be pressed into the lower fastener 420. More preferably, the lower fastener 420 may be formed corresponding to the size of the fastener hole 300 of the case body 200, and may be configured to be pressed into a lower portion of the fastener hole 300.

The case body 200 may be fixed to the vehicle body in a manner that the upper fastener 410 is pressed from the upper portion of the case body 200, the lower fastener 420 is pressed from the lower portion of the case body 200, and the weld stud bolt 100 is pressed into the lower fastener 420.

The fastener 400 preferably is formed in two pieces (e.g., a 2-piece type), fixes the case body 200 using the two pieces, and is formed of a plastic material. The fastener 400 may be divided into the upper fastener 410 and the lower fastener 420, and the case body 200 may be fixed in a structure in which two pieces are combined with each other. According to an embodiment of the present disclosure, the fastener 400 may be made of polyamide (PA) among engineering plastics. More preferably, the fastener 400 may be formed of PA66. Through this, in reassembling the fastener 400, deformation can be prevented from occurring, and stiffness can be secured.

Further, the fastener 400 may be formed of high-tech plastics, such as glass fiber reinforced plastics or carbon fiber reinforced plastics, and thus robustness can be improved even with a small size. The high-tech plastics may be polyacetal resin (POM), polybutylene terephthalate (PBT), mPPO, or polycarbonate (PC), but in the present disclosure, they are not specifically limited thereto.

The upper fastener 410 may include an upper stopper 411 configured to be exposed to an upper surface of the case body 200, and an upper fastening portion 412 formed at an end of the upper stopper 411. The lower fastener 420 may include a lower stopper 421 configured to be inserted into the lower surface of the case body 200 and a lower fastening portion 422 formed at an end of the lower stopper 421.

A clip shape may be formed on at least one end of the upper fastening portion 412, a step height corresponding to the clip shape of the upper fastening portion 412 may be formed at one end of the lower fastening portion 422, and the upper fastening portion 412 and the lower fastening portion 422 may be fastened to each other.

The upper stopper 411 may be configured to be exposed to the upper surface of the case body 200. More preferably, after being pressed from top to bottom through the fastener hole 300, the upper stopper 411 may be formed so that the upper fastener 410 is not pushed. The upper fastening portion 412 may be formed at the end of the upper stopper 411 to be combined with the lower fastener 420.

The lower stopper 421 may be inserted into the lower surface of the case body 200. More preferably, after being pressed from bottom to top through the fastener hole 300, the lower stopper 421 may be formed so that the lower fastener 420 is not pushed. The lower fastening portion 422 may be formed at the end of the lower stopper 421 to be combined with the upper fastener 410.

The upper fastening portion 412 and the lower fastening portion 422 may be mutually combined with each other and may be configured to fix the upper fastener 410 and the lower fastener 420. More preferably, a clip shape may be formed on at least one end of the upper fastening portion 412, and a step height corresponding to the clip shape of the upper fastening portion 412 may be formed at one end of the lower fastening portion 422.

The clip shape of the upper fastening portion 412 is configured to be locked in the step height formed on the lower fastening portion 422 to fix the upper fastener 410 and the lower fastener 420.

The weld stud bolt 100 of the vehicle body may be configured to be pressed into the lower fastener 420 to fix the case body 200 to the vehicle body. More preferably, the inner diameter may be configured to correspond to the outer diameter of the weld stud bolt 100, and thus the weld stud bolt 100 may be pressed and fixed to the lower fastener 420.

In summary, the present disclosure provides a tool case fixing structure of a vehicle, which can prevent a tool case from separating and falling even when supporting a spare tire through a fastener structure being fixed to a vehicle body, and can heighten spatial utility of a concept car (or future vehicle) mounted with a battery through installation of the tool case in a side space of the spare tire.

As described above, the detailed explanation exemplifies the present disclosure. Further, the above-described contents are to explain a preferred embodiment of the present disclosure, and the present disclosure can be used in various different combinations, variations, and environments. That is, variations or corrections are possible within the range of the concept of the present disclosure disclosed in the description, within the range equivalent to the above-disclosed contents, and/or within the range of the technology or knowledge in the art. The described embodiment is to explain the best state for embodying the technical idea of the present disclosure, and various modifications required in the detailed application fields and usage purposes are possible. Accordingly, the foregoing detailed explanation of the present disclosure is not intended to limit the present disclosure to the disclosed embodiment. Further, the appended claims should be interpreted to include other embodiments.

What is claimed is:

1. A tool case fixing structure of a vehicle, comprising:
   at least two weld stud bolts located on a floor panel of a vehicle body and formed at a front end and a rear end in a length direction of the vehicle;
   a case body inserted into one side of a spare tire of the vehicle and having a plurality of tool grooves formed to insert a tool into the tool grooves;
   at least two fastener holes formed on the case body corresponding to locations of the weld stud bolts; and
   at least two fasteners formed corresponding to locations of the fastener holes and configured to be fastened with the weld stud bolts to fix the case body to the vehicle body.

2. The tool case fixing structure of claim 1, wherein the fastener comprises:
   an upper fastener pressed into an upper portion of the case body; and
   a lower fastener pressed into a lower portion of the case body and configured to cause the weld stud bolt to be pressed into the lower fastener.

3. The tool case fixing structure of claim 2, wherein the upper fastener includes:
   an upper stopper configured to be exposed to an upper surface of the case body; and
   an upper fastening portion formed at an end of the upper stopper, and
   the lower fastener includes:
   a lower stopper configured to be inserted into a lower surface of the case body; and
   a lower fastening portion formed at an end of the lower stopper.

4. The tool case fixing structure of claim 3, wherein a clip shape is formed on at least one end of the upper fastening portion, a step height corresponding to the clip shape of the upper fastening portion is formed at one end of the lower fastening portion, and the upper fastening portion and the lower fastening portion are fastened to each other.

5. The tool case fixing structure of claim 1, wherein the fastener is installed to be visible.

6. The tool case fixing structure of claim 1, wherein the case body is fixedly installed to be spaced apart for a predetermined distance from an outer diameter of the spare tire.

7. The tool case fixing structure of claim 1, wherein the fastener fixes the case body in two pieces, and is formed of a plastic material.

8. The tool case fixing structure of claim 1, wherein one side surface and a lower surface of the case body are configured to have a shape corresponding to a shape of the vehicle body to be supported on the vehicle body surface.

9. The tool case fixing structure of claim 1, wherein the case body is configured to have the tool grooves formed on a lower portion of the case body in a height direction.

* * * * *